United States Patent
Young et al.

(10) Patent No.: US 8,632,867 B2
(45) Date of Patent: Jan. 21, 2014

(54) EXTRUDED PET PARISON, CONTAINER, AND METHOD

(75) Inventors: William C. Young, Ypsilanti, MI (US); Harvey Shannon Holt, Botkins, OH (US); Gates Moss, Cincinnati, OH (US); Michael C. Kitzmiller, Fort Loramie, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 13/595,802

(22) Filed: Aug. 27, 2012

(65) Prior Publication Data
US 2013/0048634 A1 Feb. 28, 2013

Related U.S. Application Data

(60) Provisional application No. 61/590,652, filed on Jan. 25, 2012, provisional application No. 61/527,443, filed on Aug. 25, 2011.

(51) Int. Cl.
*B29D 22/00* (2006.01)

(52) U.S. Cl.
USPC ........................................ 428/35.7; 428/36.91

(58) Field of Classification Search
USPC ................ 428/35.7, 36.91; 220/671; 215/382
See application file for complete search history.

(56) References Cited

U.S. PATENT DOCUMENTS

| | | | |
|---|---|---|---|
| 4,764,403 A | 8/1988 | Ajmera | |
| 5,289,921 A | 3/1994 | Rodrigo et al. | |
| 6,109,006 A * | 8/2000 | Hutchinson | 53/452 |
| 6,112,925 A * | 9/2000 | Nahill et al. | 215/382 |
| 7,510,391 B2 | 3/2009 | Larson et al. | |
| 8,282,876 B2 * | 10/2012 | Larson et al. | 264/540 |
| 2002/0061371 A1 | 5/2002 | Schmidt et al. | |
| 2005/0118406 A1 | 6/2005 | Shelby et al. | |
| 2006/0275569 A1 | 12/2006 | Mishra et al. | |
| 2007/0129501 A1 | 6/2007 | Chen et al. | |
| 2008/0093777 A1 | 4/2008 | Sequeira | |
| 2009/0264545 A1 | 10/2009 | Sequeira | |
| 2010/0201015 A1 | 8/2010 | Fujimaki et al. | |
| 2011/0262668 A1 * | 10/2011 | Akkapeddi et al. | 428/35.7 |

FOREIGN PATENT DOCUMENTS

CA       2499309 C       5/2012

OTHER PUBLICATIONS

Commissioner for Patents: International Search Report and Written Opinion in corresponding International Application No. PCT/US2012/052512. Date of Mailing: Feb. 8, 2013.

US Commissioner of Patents; International Search Report and Written Opinion in counterpart International Application No. PCT/US2013/022992. Date of Mailing: Mar. 25, 2013.

* cited by examiner

*Primary Examiner* — N. Edwards
(74) *Attorney, Agent, or Firm* — Dykema Gossett PLLC

(57) ABSTRACT

An extruded PET parison includes a first extruded polymer comprising PET, and a second extruded polymer comprising PET. In embodiments, the first extruded polymer and the second extruded polymer are co-extruded, and the first extruded polymer has an intrinsic viscosity that is higher that the intrinsic viscosity of the second extruded polymer. A monolayer embodiment is also disclosed. In embodiments, a monolayer extruded PET container is comprised of bottle grade PET resin that has been solid stated and may have an IV from about 0.96 to about 1.4.

13 Claims, 4 Drawing Sheets

EXTRUDED PET PARISON, CONTAINER, AND METHOD

CROSS-REFERENCE TO RELATED APPLICATION

This application claims the benefit of priority to U.S. Provisional Patent Application No. 61/527,443, filed Aug. 25, 2011 and U.S. Provisional Patent Application 61/590,652, filed Jan. 25, 2012, the entire disclosures of which are incorporated herein by reference.

TECHNICAL FIELD

The present invention relates generally to extrusion blow molding (EBM) methods and systems capable of utilizing injection stretch blow molding (ISBM) grade polyethylene terephthalate (PET) to produce articles including bottles and containers.

BACKGROUND

Polymer resins, including PET, are commonly employed in the plastic packaging industry. Because of its favorable processing properties, and because PET is considered recycling-friendly, PET is widely used to produce numerous types of bottles and containers (which may herein be collectively referred to as simply "containers"). In the bottle industry, for example, bottle-grade PET usually has a resin intrinsic viscosity (IV) of about 0.65 to 0.87 dL/g, and is commonly used in connection with ISBM processing.

Extrudable PET compositions or formulations (e.g., extrudable PET co-polymers) are also known in the packaging industry. EBM PET can be desirable in connection with a number of applications, as it can permit the use of PET to form articles that are commonly formed from HDPE, for example, large plastic containers with handles. For PET to be suitable for EBM processes, a higher molecular weight PET, i.e., one having a higher IV (e.g., about 1.0 dL/g or greater) may be needed. However, such co-polymers are commonly amorphous, or slow-crystallizing, which can present certain conversion and reclamation challenges. While a slow-crystallizing co-polymer may allow for easier processing in EBM environments, the resulting container can, among other things, present recyclability challenges. For instance, when the material has not yet crystallized, and remains amorphous, it may melt at lower temperatures. Further, when amorphous or slow crystallizing resins are added to the PET recycling stream, the resins can cause, inter alia, unwanted sticking, thermal agglomeration, and bridging (or port plugging) issues. Such issues can make PET polymer resins unsuitable for conventional recycling programs and processes. Containers using Eastman EB062 material fall into this category as can they present such recycling and performance issues since the PET resin is modified with additives for increased melt strength.

Moreover, if a bottle grade PET and an extrudable PET composition are blended or combined, so as to be provided in the form of branched PET copolymers, the resulting combination of resins may not exhibit performance characteristics that are sufficiently desirable. That is generally from a recycling standpoint, the higher percentage of extrusion-grade PET, the more undesirable the characteristics of the resulting product.

The use of standard ISBM-grade PET in the extrusion context might help to address some the aforementioned recyclability issues. However, for reasons such as noted above, such resins have generally not been successfully commercialized because of a number of challenges. Such resins typically have a low IV, i.e., commonly from about 0.65 to 0.87. As a result, they tend not to be able to carry their own weight and/or the resins may extrude too quickly to form a desired capturable parison. This presents a problem for most, if not all, EBM processes, which requires adequate melt strength in order to produce an acceptable parison (whether it be in a shuttle EBM system, a wheel EBM system, or any other). Without adequate melt strength, the parison will not form correctly and may flow too quickly ("like water") to be captured by a blow mold. Additionally, with some articles, a lower IV may provide less container strength, more susceptibility to stress fractures or cracks, and undesirable visual haze or streaks.

Consequently, there remains a desire for an EBM method and system to produce commercially acceptable and bottles and/or containers that are compatible with the recycling stream from extrusion-grade PET compositions or formulations.

SUMMARY

Extruded PET parisons, containers, and methods of producing such parisons and containers are disclosed. In embodiments, a first extruded polymer and a second extruded polymer are co-extruded, the first extruded polymer comprises PET, the second extruded polymer comprises PET, and the intrinsic viscosity of the first extruded polymer is higher that the intrinsic viscosity of the second extruded polymer. The co-extruded parison may be subsequently blow molded to form a container.

In the as embodiment, the first extruded polymer (i.e., the higher IV polymer) may comprise PET having an IV of from about 0.96 or greater. If desired, the first extruded polymer may have an IV from about 1.0 to 1.4, and may, for example, be created by solid-stating standard bottle grade PET and may be devoid of chain extenders. The second extruded polymer (i.e., the lower IV polymer) may also comprise PET, and may have an IV of about 0.85 or less. If desired, the second extruded polymer may have an IV of from about 0.8 to 0.85. Additionally, the second extruded polymer may further comprise post-consumer recycled (PCR) PET and regrind PET, and/or may optionally include a colorant and/or a barrier.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
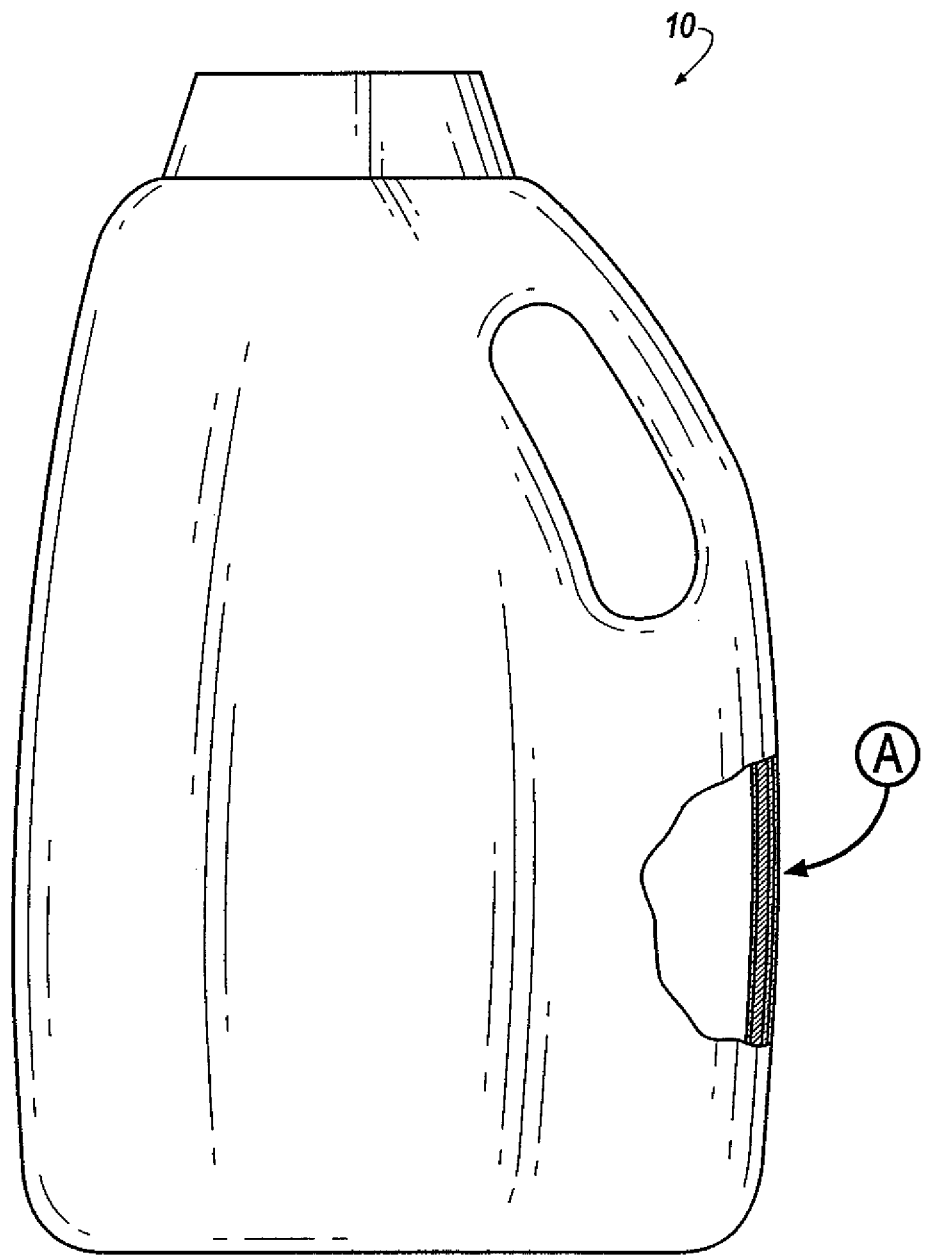
FIG. 1 is a partially broken away view that generally illustrates an embodiment of a multi-layer extrusion blow molded container.
Figure 2:
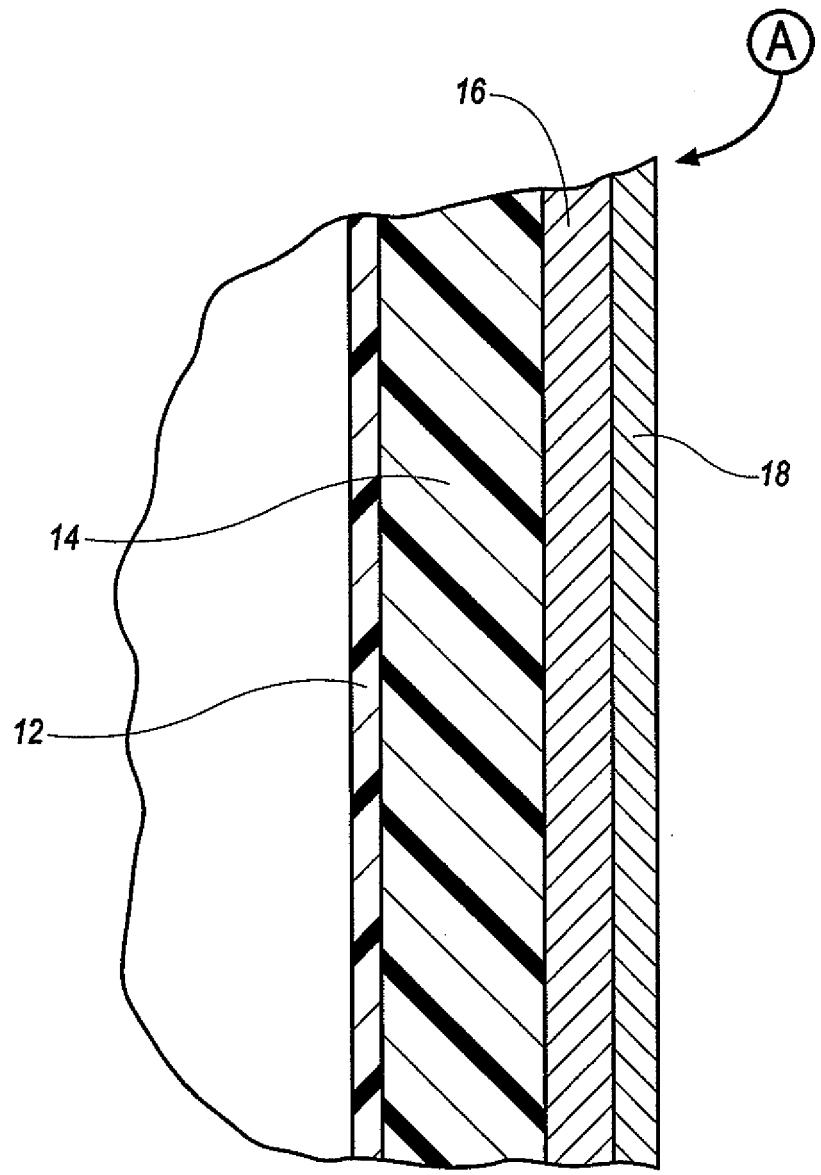
FIG. 2 is a partial sectional view that generally illustrates a wall of the molded container.
Figure 3:
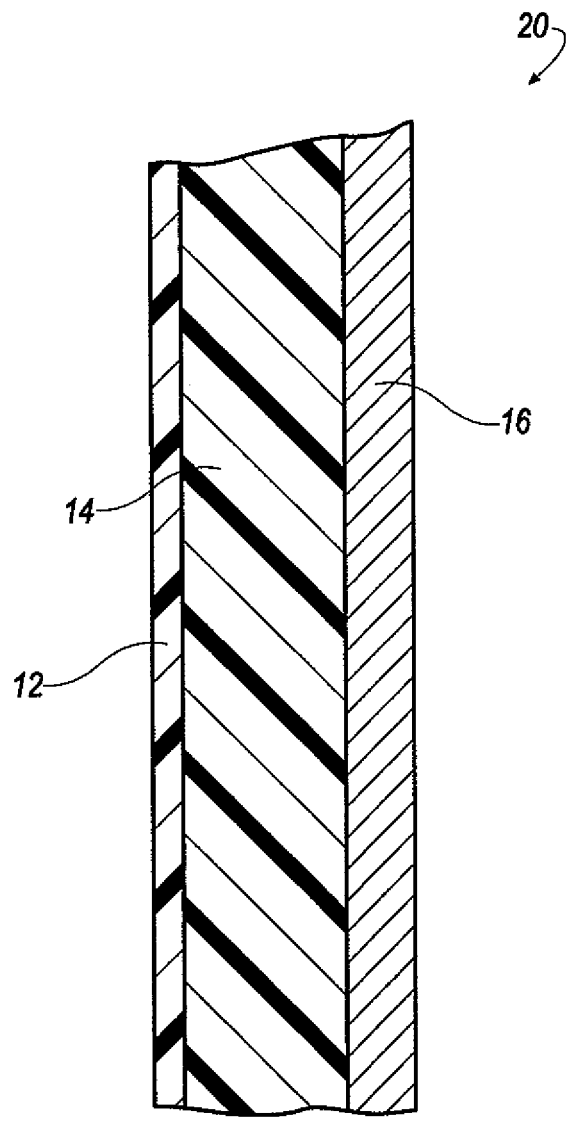
FIG. 3 is a partial sectional view of a wall of an embodiment of an intermediate article.
Figure 4:
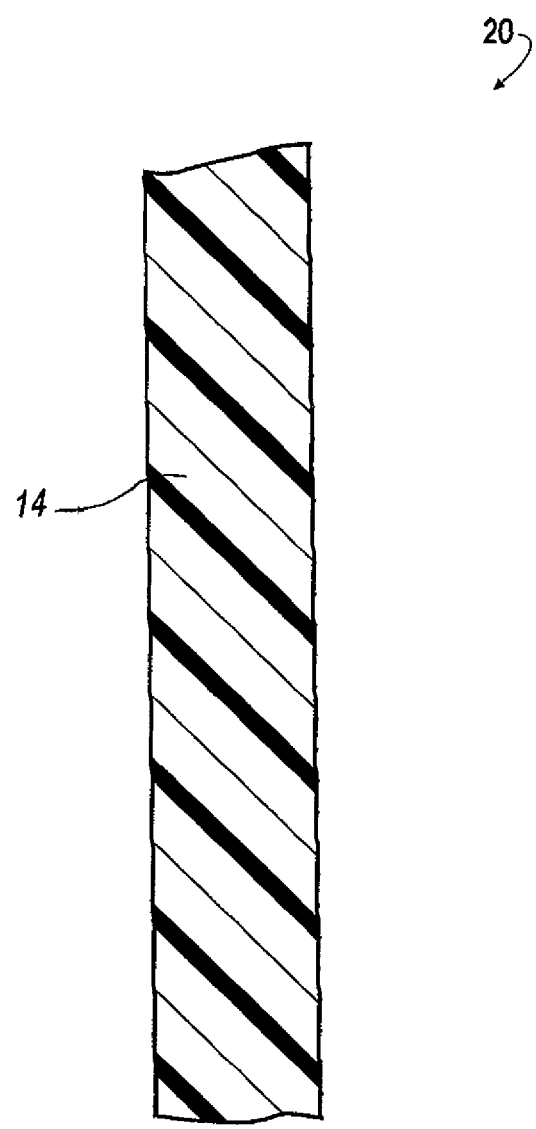
FIG. 4 is a partial sectional view of a wall of another embodiment, which is associated with a monolayer article.

By way of example only, and without limitation, FIG. 1 generally shows a partially broken away view that generally illustrates an embodiment of a multi-layer extrusion-blow molded container 10. FIG. 2 depicts a partial sectional view that generally illustrates a portion of a wall (identified as portion A) of the container 10. In the illustrated embodiment, innermost three layers 12, 14, 16 may be formed in a first processing stage which may involve co-extrusion or multiple extrusions of materials—and may provide an intermediate article 20, or parison. In the illustrated embodiment an optional, fourth/outermost layer 18 is included. The optional outermost layer, if included, 18 may be comprised of similar or different plastic material than the other layers and, if desired, may comprise a coating. An embodiment of a wall portion of an intermediate article or parison is generally illustrated in FIG. 3. While three layers are disclosed in connection with the intermediate article 20 or parison, and four layers are disclosed in connection with the container 10, those of skill in the art will recognize that more layers (or even less layers with respect to the intermediate article 20 or parison) may be provided and the layers may have different configurations and thicknesses (including differing thicknesses as to a given layer and relative layer-to-layer thickness variations). FIG. 4 generally illustrates an embodiment of a wall portion of a monolayer article or container. The article or container is generally comprised of a single layer (generally illustrated as layer 14).

In embodiments of the present disclosure, a method is provided in which two or more polymers are co-extruded to form a parison that can be subsequently blow into a bottle or container. In an embodiment, two separate polymers may be provided. A first polymer may comprise PET and may have a comparatively higher IV—e.g., 0.96 or greater (or, for instance, from about 1.0 to about 1.4). The first polymer may, for example and without limitation, be created by solid-stating standard bottle grade PET and may be devoid of chain extenders. A second polymer may also comprise PET and may have a comparatively lower IV—for instance, less than about 0.85 (or, for example, from about 0.8 to about 0.87). The second polymer, i.e., having a comparatively lower IV, may comprise post-consumer recycled (PCR) PET and/or regrind PET. Moreover, for some embodiments, the second polymer may additionally include one or more colorants.

In an embodiment, the first polymer may be provided with an IV of, for example, about 0.97, while a second polymer may have an IV of, for example, 0.76. The layer with the comparatively higher IV can serve to handle higher melt temperatures and provide strength, and can additionally help to prevent migration.

In embodiments of a method and system, the first (higher IV) and second (lower IV) polymers may be extruded and combined—e.g., via an extrusion head—to form a parison having multiple (e.g., two) layers. In an embodiment, the cross-sectional thickness (along the sidewall and perpendicular to the centerline of the parison) of the higher-IV layer may be about 20% (0.20) of the total parison thickness, and the thickness of the lower-IV layer may be about 80% (0.80) of the total parison thickness. Further, depending on the desired content of the resulting bottle or container, the higher-IV layer and the lower-IV layer may be interchanged with respect to which layer is the inner co-extruded layer and which layer is the outer co-extruded layer.

Embodiments of bottles and containers produced in accordance with the present disclosure may comprise crystalline PET, may exhibit commercially acceptable clarity, and may be fully recyclable in the standard PET recycling stream (i.e., marked as "No. 1").

In embodiments, an extrudable PET—that is not solid-stated—may have a "composite" IV of about 0.96, or less, so as to be able to extrude down. The invention is not, however, limited to equipment that extrudes in the direction of gravity, and other known techniques may be employed.

Further, the disclosed method and system may be applied to parisons formed in one co-extruded layer, or in multi-layer embodiments that have two or more extruded layers. Moreover, in embodiments, one layer may serve as a carrier layer, while the other layer(s) may impart one or more other structures or features. Such other structures or features may include the use of PCR, coloring (e.g., an outside color), or cost optimization (e.g., inclusion of a comparatively less expensive ("junk") middle layer). Without limitation, in an embodiment the a comparatively high-IV polymer may serve as a skeleton, while another layer may include as much as 28% or more PCR. Further, without limitation, some embodiments of resulting bottles or containers may comprise a PCR content of between about 10% to 50% by weight. In other embodiments, the PCR content may be in the nature of about 20% to 30% by weight. Moreover, if desired, a junk layer of 80% or more (even up to 100%) PCR may additionally be included. Embodiments of the present disclosure are not dependent upon chain extenders, and are not combinations of amorphous and solid state resins. That is, the extrudable polymers can be provided in a solid state condition, and are not amorphous.

A potential benefit of a dual layer is the ability to utilize a carrier resin. It is also possible to color one or both layers to provide different visual effects, whether the layer or layers are colored alone or in various combinations. Further, if permeation is a potential issue, one or more barrier layers may be employed in connection with one or more layers of the parison/article.

Parisons associated with the disclosed concept may be processed utilizing various forms of known processing techniques and equipment. For some embodiments, a "shuttle"-type system may be used. With shuttle-type equipment a head with multiple outlets may provide a parison at a common spot and a mold or molds can be moved, or shuttled, in position under the parison. Such a system may work well if space is an issue and/or if production will be more "on demand" with less concerns about high capacity and speed. Alternatively, various known rotary or "wheel" extrusion techniques may be employed where a more "continuous" process, with potentially higher speed and output, is desirable. In embodiments, wheel extrusion devices and apparatus may, as desired, be configured to extrude in various directions—for example, upwards or, perhaps more desirably for some applications, downwards.

Another embodiment of the present disclosure comprises a monolayer extruded PET container made from standard bottle grade PET resin that has been solid-stated. Standard bottle grade PET resin may have an IV of from about 0.65 to about 0.87. With embodiments of the instant disclosure, such PET resin may be solid-stated to increase its IV to from about 0.96 to about 1.4, and for some embodiments, about 1.1. Such resin may be devoid of chain extenders or other similar additives or modifiers. Extrusion blow molding of such resin, for example in connection with a downward-extruding wheel process, can produce a recyclable (e.g., #1 marked) PET container with good clarity and material distribution (which can result in improved container strength and performance). As referenced herein "good clarity" may describe containers that are substantially free of striations and/or haze. Containers produced in accordance with the teachings of this disclosure can result in containers that are well suited to withstand drop tests, including conventional three-foot drop tests (which may be "chilled" or "unchilled" tests). That is, with limited testing, a significant number (e.g., greater that 50%) of the tested containers pass a three-foot drop test. In embodiments, in connection with the EBM processing of such resin, it can be desirable to maintain generally consistent mold temperatures.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. An extruded PET parison comprising:
 a first extruded polymer comprising PET; and
 a second extruded polymer comprising PET;
 wherein the first and second polymers are co-extruded, the first and second extruded polymers are in a solid state following extrusion, the second extruded polymer has an intrinsic viscosity of about 0.80 to about 0.87, and the first extruded polymer has an intrinsic viscosity that is higher that the intrinsic viscosity of the second extruded polymer.

2. The parison of claim 1, wherein the first extruded polymer has an intrinsic viscosity of at least 0.96.

3. The parison of claim 1, wherein the first extruded polymer has an intrinsic viscosity from about 1.0 to about 1.4.

4. The parison of claim 1, wherein the second extruded polymer has an intrinsic viscosity of less than 0.85.

5. The parison of claim 1, wherein the second extruded polymer comprises post-consumer recycled (PCR) PET or regrind PET.

6. The parison of claim 1, wherein the second extruded polymer includes a colorant.

7. The parison of claim 1, wherein the cross-sectional thickness of the first extruded polymer is at least about 0.20 of the total parison thickness.

8. The parison of claim 1, wherein the cross-sectional thickness of the second extruded polymer is less than about 0.80 of the total parison thickness.

9. The parison of claim 1, including one or more additional extruded polymer layers.

10. The parison of claim 9, wherein the one or more additional extruded polymer layers comprise recycled or reground material.

11. A container formed from the parison of claim 1.

12. The parison of claim 1, wherein the first extruded polymer is adjacent the second extruded polymer.

13. The container of claim 11, wherein the first extruded polymer is adjacent the second extruded polymer.

* * * * *